(12) United States Patent
Di Maggio et al.

(10) Patent No.: US 12,337,266 B2
(45) Date of Patent: Jun. 24, 2025

(54) FILTER DEVICE FOR A WATER-BEARING DOMESTIC APPLIANCE, A WATER-BEARING DOMESTIC APPLIANCE WITH A FILTER DEVICE AND A METHOD FOR FILTERING WATER WITH A FILTER DEVICE

(71) Applicant: E.G.O. Elektro-Geraetebau GmbH, Oberderdingen (DE)

(72) Inventors: Antonio Di Maggio, Schwaigern (DE); Uwe Schaumann, Oberderdingen (DE)

(73) Assignee: E.G.O. Elektro-Geraetebau GmbH, Oberderdingen (DE)

( * ) Notice: Subject to any disclaimer, the term of this patent is extended or adjusted under 35 U.S.C. 154(b) by 466 days.

(21) Appl. No.: 17/810,893

(22) Filed: Jul. 6, 2022

(65) Prior Publication Data

US 2023/0016651 A1    Jan. 19, 2023

(30) Foreign Application Priority Data

Jul. 13, 2021  (DE) ..................... 10 2021 207 442.1

(51) Int. Cl.
*B01D 29/96*    (2006.01)
*A47L 15/42*    (2006.01)
(Continued)

(52) U.S. Cl.
CPC .......... *B01D 29/96* (2013.01); *A47L 15/4208* (2013.01); *B01D 29/23* (2013.01);
(Continued)

(58) Field of Classification Search
None
See application file for complete search history.

(56) References Cited

U.S. PATENT DOCUMENTS

| 3,305,093 A | 2/1967 | Brubaker et al. |
| 6,402,962 B1 | 6/2002 | Bruntz et al. |

(Continued)

FOREIGN PATENT DOCUMENTS

| CN | 111247283 A | 6/2020 |
| CN | 112914464 A | 6/2021 |

(Continued)

OTHER PUBLICATIONS

European Patent Office, Extended European Search Report received for Application No. 22179978.6, dated Dec. 5, 2022, 8 pages, Germany.

(Continued)

*Primary Examiner* — Chester T Barry
(74) *Attorney, Agent, or Firm* — ALSTON & BIRD LLP

(57) ABSTRACT

A filter device for a water-bearing domestic appliance which has a surface filter with a sleeve shape, a support structure for said surface filter and a flow-through filter housing with filter inlet and filter outlet. The surface filter is held stably on the support structure, which has through-flow openings and a central opening at the end. A first flow path for water leads into the support structure and out again through the through-flow openings and the surface filter. A second flow path leads into the support structure and out again only through the central opening. The support structure is designed circumferential and is formed by support ribs which between them comprise the through-flow openings. The surface filter is attached or pressed onto the outside of the support structure in such a way that it covers the through-flow openings and rests on the outside of the support ribs.

22 Claims, 5 Drawing Sheets

(51) Int. Cl.
    *B01D 29/23*     (2006.01)
    *B01D 35/26*     (2006.01)
    *B01D 35/30*     (2006.01)
    *C02F 1/00*     (2023.01)
    *D06F 39/08*     (2006.01)
    *C02F 103/00*     (2006.01)

(52) U.S. Cl.
CPC ............ *B01D 35/26* (2013.01); *B01D 35/30* (2013.01); *C02F 1/001* (2013.01); *D06F 39/088* (2013.01); B01D 2201/02 (2013.01); B01D 2201/0415 (2013.01); B01D 2201/301 (2013.01); C02F 2103/002 (2013.01); C02F 2307/12 (2013.01)

(56) References Cited

U.S. PATENT DOCUMENTS 6,878,266 B2 * 4/2005 Leaverton ............... C02F 1/004
                                                  220/495.11

11,261,558 B2   3/2022  Eiselt et al.
2004/0149666 A1   8/2004  Leaverton

FOREIGN PATENT DOCUMENTS

| | | |
|---|---|---|
| DE | 202006001793 U1 | 3/2007 |
| DE | 102019219054 B3 | 2/2021 |
| WO | WO 2013/184814 A1 | 12/2013 |
| WO | WO 2015/123300 A1 | 8/2015 |
| WO | WO 2019/081014 A1 | 5/2019 |

OTHER PUBLICATIONS

German Patent and Trade Mark Office, Office Action received for Application No. DE 102021207442.1, dated Mar. 16, 2022, 6 pages, Germany.

* cited by examiner

FILTER DEVICE FOR A WATER-BEARING DOMESTIC APPLIANCE, A WATER-BEARING DOMESTIC APPLIANCE WITH A FILTER DEVICE AND A METHOD FOR FILTERING WATER WITH A FILTER DEVICE

CROSS-REFERENCE TO RELATED APPLICATIONS

This application claims priority to German Application No. 10 2021 207 442.1, filed Jul. 13, 2021, the contents of which are hereby incorporated herein in its entirety by reference.

FIELD OF APPLICATION AND PRIOR ART

The invention relates to a filter device for a water-bearing domestic appliance, a water-bearing domestic appliance with such a filter device and a method for filtering water in a filter device of such a water-bearing domestic appliance.

It is known from CN 112914464 A1 to provide a filter device in a water-bearing domestic appliance such as a washing machine. This filter device is intended to filter out impurities and, above all, microfibers from the water so that they cannot get into the waste water and thus contribute to environmental damage. The filter device therein is designed to be removed from the washing machine and either cleaned of the collected filtrate or disposed of including the collected filtrate.

It is known from CN 111247283 A1 to filter out microfibers from the water cycle in a washing machine by means of a filter device and to collect them as filtrate. The filter device can be arranged in a conventional drawer in the upper left area of the washing machine in order to collect the filtrate there. To dispose of the filtrate, the entire drawer must be removed from the washing machine, or alternatively, a special collection container must be removed.

Object and Solution

The object of the invention is to create a filter device of the type mentioned above, a water-bearing domestic appliance of the type mentioned above, and a method of the type mentioned above, with which certain disadvantages of the prior art can be eliminated and, in particular, with which it is possible to facilitate the filtration of water in the domestic appliance and preferably to improve the disposal of filtrate, especially if it contains microfibers.

This object is achieved by a filter device having the features of claim 1, by a water-bearing domestic appliance having the features of claim 17 and by a method having the features of claim 20. Advantageous and preferred configurations of the invention are disclosed in the claims and are explained in more detail below. Some of the features are only described with regard to the filter device, the water-bearing domestic appliance or the method, respectively. However, irrespective of this, they should be able to apply to a filter device, a method and a water-bearing domestic appliance separately and independently of one another. The wording of the claims forms part of the content of the description by explicit reference.

The filter device has a surface filter with a sleeve shape, advantageously in the form of a conical sleeve. In a particularly advantageous manner, the surface filter has a circumferential lateral surface which has or forms the filter function. Reinforcement can be provided at least at one end, advantageously at both ends, for example as a circumferential reinforcing ring. This can be used to give the surface filter a shape. Furthermore, the filter device has a support structure for the surface filter, on which the surface filter is placed when the filter device or the water-bearing domestic appliance is in operation. While in the case of typical paper filter bags by the brand Melitta the surface filter is arranged in the form of a filter bag in a cup-like carrier, for example, in the invention the surface filter can be attached, mounted or pushed onto the support structure. Furthermore, the filter device has a flow-through filter housing with a filter inlet and a filter outlet. The surface filter and support structure are located in this filter housing. The surface filter is held on the support structure and thus has a surface filter shape that is adapted to an outer shape of the support structure. The surface filter is held firmly and is stabilized by the support structure, particularly when water flows through it in order to filter it. The support structure has through-flow openings that point towards the surface filter. The support structure has a central opening at its end through which water can flow without going through the surface filter. There is a first flow path for water, which leads into the support structure and then out of the support structure through the through-flow openings, where it then passes directly through the surface filter. Water flowing along this first flow path is filtered by the surface filter.

There is also a second flow path for water, which likewise leads into the support structure, advantageously in the same way as the first flow path, namely coming through the filter inlet. However, it leads out again through the central opening at the end of the support structure. Water that flows along the second flow path is therefore not filtered, since this second flow path no longer leads through the surface filter.

Whether the water is filtered or not is dependent on whether it flows along the first flow path or along the second flow path. This is explained in more detail below.

According to the invention, the support structure is designed sleeve-like or tubular or conically circumferential and is essentially formed by support ribs which between them form or comprise the through-flow openings. Thus, the support structure provides structure and stability to the surface filter, possibly in addition to the aforementioned frames. Furthermore, this support structure is equally or even highly permeable to water in order to disturb the flow of water as little as possible. The surface filter is fastened to the outside of the support structure or slipped or pushed over it. In doing so, it covers the aforementioned through-flow openings and rests on the outside of the support ribs or the support structure. It can optionally also be pressed on or held from the outside, wherein such an additional holder would in turn have to disrupt the flow as little as possible in order to be able to optimize this flow.

Thus, with the invention, a filter device is created which has a very advantageous surface filter. The surface filter can be removed from the filter device or removed from the support structure, particularly when it is full or clogged with filtrate. Either the filtrate can be disposed of alone or the surface filter can be disposed of together with the filtrate. The surface filter can consist of a filter material such as paper or filter paper, fabric, scrim, knitted fabric or the like, in particular synthetic fiber. It should have a relatively simple and inexpensive design so that it can be disposed of with the filtrate or disposed of in a particular way. This makes it possible to dispense with a complicated and convenient and possibly also cost-intensive process of separating the filtrate from the surface filter.

The support structure can advantageously consist of plastic and in particular can be designed in one piece or integrally. For example, it can be produced as a plastic injection molded part.

In an advantageous development of the invention, the support structure and, above all, the surface filter can be designed as a so-called Sanderson filter, as is known in particular from WO 2015/123300 A1 and WO 2013/184814 A1. Express reference is made to these publications and their content relating to the realization of such a surface filter is incorporated into the content of the present application by explicit reference. Its shape can be such that it tapers towards its end, in particular in the flow direction of the water, i.e., along both flow paths. In this case, it can be particularly advantageously provided that the support structure and the surface filter are designed to be rotationally symmetrical, so to speak, particularly as far as the lateral surfaces are concerned. A preferred shape is tapered in said flow direction so as to be tapered here, as previously described. A rotationally symmetrical design makes it possible to produce relatively uniform flow and pressure conditions within the support structure or within the surface filter.

In a further possible embodiment of the invention, the support ribs can have a polygonal cross section, in particular a square cross section, in their longitudinal direction. An inner surface of this cross section of the support ribs pointing into an interior space of the support structure can be parallel to the surface filter and can be either straight or correspondingly rounded. In particular, an outwardly pointing outer surface of the cross section is parallel to the surface filter and is therefore likewise straight or rounded, as mentioned above.

Furthermore, it is possible for the aforementioned inner surface and outer surface of the cross section of the support structure or a support rib to be connected by through-flow surfaces. These flow-through surfaces can run in planes that are parallel to one another. These parallel planes, in turn, are perpendicular to a central longitudinal axis of the support structure. Alternatively, the parallel planes could also run at right angles to the inner surface or outer surface.

In a further advantageous embodiment of the invention, the end of the support structure pointing in the flow direction of the water to be filtered is closed and has only the aforementioned central opening. This closed configuration is formed by the support structure itself and not only by the surface filter or a part attached thereto.

At least part of the support ribs is preferably formed by circumferential rib rings. These rib rings can advantageously define ring planes which run at right angles to an aforementioned central longitudinal axis of the support structure. In addition to the rib rings, at least one longitudinal rib can be provided, which connects several rib rings, preferably all rib rings, to one another. All rib rings are connected to at least one longitudinal rib. At least one longitudinal rib, in particular at least two longitudinal ribs or all of the longitudinal ribs, is particularly advantageous in order to connect all of the rib rings. Thus, a simple configuration of the support structure has several rib rings, for example two to six rib rings, and several longitudinal ribs, for example two to six longitudinal ribs. The support ribs and the longitudinal ribs are made in one piece and in one piece with one another in the aforementioned manner.

A spacing of the rib rings from one another, in particular along a central longitudinal axis of the support structure, is advantageously the same in each case. In a similar form, the distance between the longitudinal ribs in the circumferential direction can also be the same in each case. Viewed in the circumferential direction, the flow conditions are as equal as possible to allow for the most efficient and complete filtering possible.

In an embodiment of the invention it is provided that the support structure including the surface filter comes into the filter housing at a maximum distance of 3 cm behind the filter inlet in the flow direction of the water to be filtered. Advantageously, it can even be provided that the filter inlet leads into the filter housing directly into the support structure. On the one hand, the support structure can be a separately manufactured part that is fastened, advantageously permanently fastened, in the filter housing. Alternatively, the support structure can be designed to be removable from the filter housing, for example in order to detach the surface filter therefrom. The support structure and surface filter are preferably arranged in the filter housing in such a way that all water that flows through the filter device or through the filter housing along one of the aforementioned two possible flow paths runs or flows through the support structure in any case. The filter outlet then leads out of the filter housing, wherein water either flows along the first flow path and thus through the surface filter or along the second flow path. However, if it flows along the second flow path through the support structure, it does not flow through the surface filter and can thus flow out of the filter housing. An adjustment as to whether the water flows along the first flow path or along the second flow path can be carried out by mechanical means such as switches, valves or the like. This is advantageously carried out alternatively by geometrically designing the filter device and especially the support structure including the surface filter, such that it depends on the applied water pressure whether and to what extent the water flows along the first flow path and/or the second flow path.

Thus, only part of the water that flows through the entire filter device or through the filter housing also flows through the surface filter. The other part flows, so to speak, past the surface filter and through the support structure, but through the central opening at the end and is therefore not filtered. Depending on the distribution of the ratio between these two flows along the two flow paths, a total throughput or a total through-flow through the filter device can be adjusted. This has the significant advantage that, in an alternative possibility, only part of the water flowing through is filtered, so that the total flow through is relatively large. If the same amount of water is left the same, for example because neither fresh water is added to the water-bearing domestic appliance nor waste water is discharged, then gradually, for example with at least five or at least ten passes through the filter device, correspondingly good filtering also takes place. Especially in the case of washing processes in a water-bearing domestic appliance like a washing machine, such a multiple use of water in a cycle is provided for both washing and rinsing operations. In an advantageous embodiment of the invention, it can be provided that a maximum of 50% of the total water flowing through the filter housing flows along the first flow path through the surface filter, advantageously a maximum of 30% or even a maximum of 10%.

A flow of water along the second flow path can thus also be viewed as a type of bypass or bypass water flow since it does not pass through the filter. It is mainly used to achieve an overall flow, which ultimately has to take place with a certain flow rate for a practical work process in the domestic appliance. But even with this through-flow, at least part of the water flowing through can be filtered.

In a further embodiment of the invention, the filter housing can be designed in such a way that it can be opened or has a removal opening, wherein a filter housing closure is provided for this purpose. This filter housing closure is designed to be removable or movable away from the removal opening in such a way that the surface filter can be removed from the support structure and can thus be removed from the filter housing. It can therefore be disposed of together with the filtrate collected therein, advantageously in a sufficiently safe and thorough manner with regard to the filtrate. A fresh and unused surface filter can be brought onto the filter housing and brought or applied onto the support structure in a corresponding or opposite manner. It is then used as a fresh filter for cleaning the water flowing through it along the first flow path.

In order to hold the surface filter in the filter housing or on the support structure, a holding device can advantageously be provided. This holding device should rest at least partially on the surface filter, preferably from the front, in particular from the outside. The surface filter can thus advantageously be held between the holding device on the one hand and the support structure on the other hand. In particular, the holding device thus holds the surface filter against the applied water pressure of the water flowing through. The holding device should be provided at least in an end region of the surface filter lying opposite to the flow direction along the first flow path, which corresponds to the wider or widened part in a conically tapering surface filter. This holding device is advantageously movable in such a way that it can also be removed from the support structure again, so that the surface filter is free or the holding device no longer rests against the surface filter and the surface filter can therefore be removed from the support structure. In order to ensure that the surface filter is held securely on the support structure in the fastened state, it is possible for the holding device to rest against the surface filter at at least two points, viewed in the circumferential direction of the surface filter. Above all, it can advantageously be pressed against the support structure with the surface filter in between. For this purpose, the holding device can have at least one circumferential retaining ring, which is preferably designed and/or arranged in such a way that when the holding device is in the fastened state, it corresponds to the arrangement of at least one support rib or this retaining ring rests against the support rib from the outside with the surface filter in between. On the one hand, this can prevent the surface filter from being stretched too much. On the other hand, the area through which no flow can take place is reduced because the support structure rests on the inside of the surface filter, due to the fact no further surface area is lost due to the holding device or aforementioned retaining ring.

The holding device can advantageously be designed in such a way that it essentially partially or completely covers the outer surface of the surface filter. Particularly advantageously, it can be designed to be largely water-permeable, specifically as a rib structure in a similar manner to the support structure. As an alternative to this, it could have a retaining surface designed as a sieve or net. However, a rib structure or lattice structure is preferred for a reliable or sufficient mechanical stability, in particular one which corresponds to the support structure on its outside.

In a further possible embodiment of the invention, a holding guide can be provided for this holding device, wherein the holding device is guided and movable along the holding guide. The holding guide is preferably designed in such a way that, in a first end position, the holding device holds the surface filter firmly on the support structure. For this purpose, the holding device is advantageously located on or above the support structure and is pressed against it, in particular with a similar corresponding structure. In a further second end position, wherein advantageously only these two end positions are provided, the holding device can release the surface filter from the support structure for complete detachment. The surface filter can thus be removed from the support structure in order to then remove it from the filter housing or remove it through the aforementioned removal opening. A movement path of the holding guide can lead past this removal opening in order to remove the used or consumed surface filter. Furthermore, a fresh and unused surface filter can be used in this way, which is then either placed directly on the support structure and then held thereon by means of the holding device. Alternatively, the fresh, unused surface filter can be attached or fixed to the holding device and then brought together with the holding device onto the support structure and held or fastened thereto.

While the used surface filter is advantageously removed through the aforementioned removal opening, a fresh, unused surface filter can also be inserted through this removal opening, so that no further opening needs to be provided in the filter housing. Alternatively, a further opening can be provided in the filter housing. This makes it possible, for example, for the used surface filter to fall down through the downward-pointing removal opening due to gravity. Other actuators apart from the holding device, which can be moved, are not required for this. The fresh, unused surface filter can then, for example, be inserted into the filter housing from above through a corresponding separate opening, and gravity can also be used here under certain circumstances.

In addition or as an alternative to the aforementioned use of gravity, the holding device and/or the aforementioned holding guide can have a drive, which can advantageously be an electromagnetic drive or an electric motor drive. This drive is used to move the holding device in the filter housing or on or along the aforementioned holding guide. The filter device can particularly advantageously have a removal device in order to remove the surface filter from or from the holding device. Of course, a manual drive could also be implemented. Furthermore, the filter device should have a removal device in order to remove the surface filter from or from the holding device. If this previously surrounded the surface filter in the position on the support structure, it is conceivable that the surface filter adheres to the holding device on the inner side, for example because it is still wet due to the adhesion. Such a removal device can then be used to remove it safely and easily from the holding device. In a simple embodiment, this can be a movable plunger or the like, which pushes through one of the openings in the structure of the holder and thereby pushes the surface filter out of the holder.

In a further advantageous embodiment of the invention, a storage holder for a supply of surface filters can be provided on the filter device, in which several, for example more than five or more than twenty, unused surface filters can be accommodated. The storage holder can have a supply opening through which a surface filter can be removed from the storage holder or through which it can be moved. This supply opening should be located close to or directly at an aforementioned removal opening or close or directly at another opening in the filter housing through which a fresh, unused surface filter should be able to be introduced. For this introduction, introduction means are advantageously provided with which a fresh, unused surface filter can be introduced into the filter housing and can either be applied directly to the support structure or inserted into the holding device or brought onto the holding device. In turn, this holding device then applies it to the support structure and at the same time holds or fastens it thereto. A drive can advantageously be provided for such insertion means, similar to that described above for the holding device or for the holding guide. Automation is then possible and an operator does not have to do this manually.

A filter device as described above is advantageously arranged in a water-bearing domestic appliance which has a treatment chamber for objects to be treated, depending on the specific type of domestic appliance. Furthermore, the domestic appliance has a treatment chamber for objects to be treated, advantageously a watertight or lockable chamber. In addition to the above-described filter device, water pipes, and valves, where necessary, are also included. The pump preferably has a pump outlet which is connected to the filter inlet by means of a water pipe.

In a further embodiment of the invention, a collection container for used surface filters can be provided under an aforementioned removal opening from the filter housing. This collection container can be removed from the domestic appliance through a closable appliance opening; alternatively, at least one used surface filter can be disposed of from the collection container through such an appliance opening.

In a corresponding development of the invention, an aforementioned supply holder can be provided either at the same removal opening or at another, previously mentioned opening for new, unused surface filters. This should also be accessible through a closable appliance opening in order to refill new surface filters when the supply of surface filters is depleted.

The appliance openings mentioned are advantageously provided on an accessible side of the domestic appliance, in particular on a front side. In this way, built-in washing machines or dishwashers can also be operated easily.

In order to filter water using the filter device, it is provided that the domestic appliance operates normally, during which water is pumped through the filter device by means of the pump, wherein at least part of the water is filtered, as explained above. In order to filter this water or at least part of the water that flows along the first flow path, a flow of water through the filter device is set to a first limit value. This can be done easily and practically by controlling the pump accordingly. In order to now exchange the surface filter, in an exchange operation, water can be pumped through the filter device at a higher concentration or with more power by means of the pump. This is advantageously done by means of a flow of water that is higher than the aforementioned first limit value, preferably at least 50% higher than the first limit value, for example at least 100% higher. For this, the pump can work with an increased flow, specifically for a predetermined pumping time. The result is that impurities in the water, in particular the microfibers mentioned at the outset, which were previously inside the filter device or inside the surface filter and inside the support structure, but were not necessarily applied directly to the surface filter due to turbulence, are very quickly or rather suddenly pressed against the surface filter. These then remain there. If the water is then partially, largely or advantageously completely removed from the filter housing, the filter housing can be opened and the surface filter can be removed from the filter housing and from the filter device. A new and unused surface filter can then be used directly afterwards. Due to the aforementioned pressure surge or due to the higher flow rate, the objects filtered out are pressed so strongly against the surface filter from the inside that they remain on it when the surface filter is removed or taken out.

If the filter device is designed as the aforementioned Sanderson filter, it can be provided that, when water flows through it with a flow rate up to the first limit value, water flows both along the first flow path and along the second flow path. In this case, however, water vortices are generated within the support structure due to its design, which means that water can also flow through the surface filter along the first flow path. However, this flow is not strong enough for the retained impurities, in particular the microfibers mentioned above, to be pressed firmly against the surface filter. They circulate or whirl around, so to speak, within the support structure close to the surface filter, but because they do not rest against it, they cannot accumulate there or cause it to become clogged either. This means that filter performance does not decrease and, above all, the flow rate can remain largely the same.

Either an automatic sequence can be provided for removing the surface filter from the filter device and from the filter housing and/or for inserting a new and unused surface filter. The aforementioned holding device can be used for this purpose, which can then have a controllable drive. A drive for the aforementioned introduction means can also be provided in a corresponding manner.

Alternatively, the surface filter can be removed from the filter device and from the filter housing and/or a new and unused surface filter can be inserted manually. It is then possible to dispense with some or all of the drives, which would means a more simplified structure. On the other hand, appropriate access options must be created for an operator.

These and other features arise from the claims, the description and the drawings, wherein the individual features are realized individually or in combination in the form of sub-combinations in one embodiment of the invention and in other areas, and may represent advantageous and protectable embodiments, for which protection is claimed here. The subdivision of the application into individual sections and subheadings does not limit the general validity of the statements made thereunder.

BRIEF DESCRIPTION OF THE DRAWINGS

Exemplary embodiments of the invention are shown schematically in the drawings and are explained in more detail below. In the drawings.

DETAILED DESCRIPTION OF THE EXEMPLARY EMBODIMENTS

Figure 1:
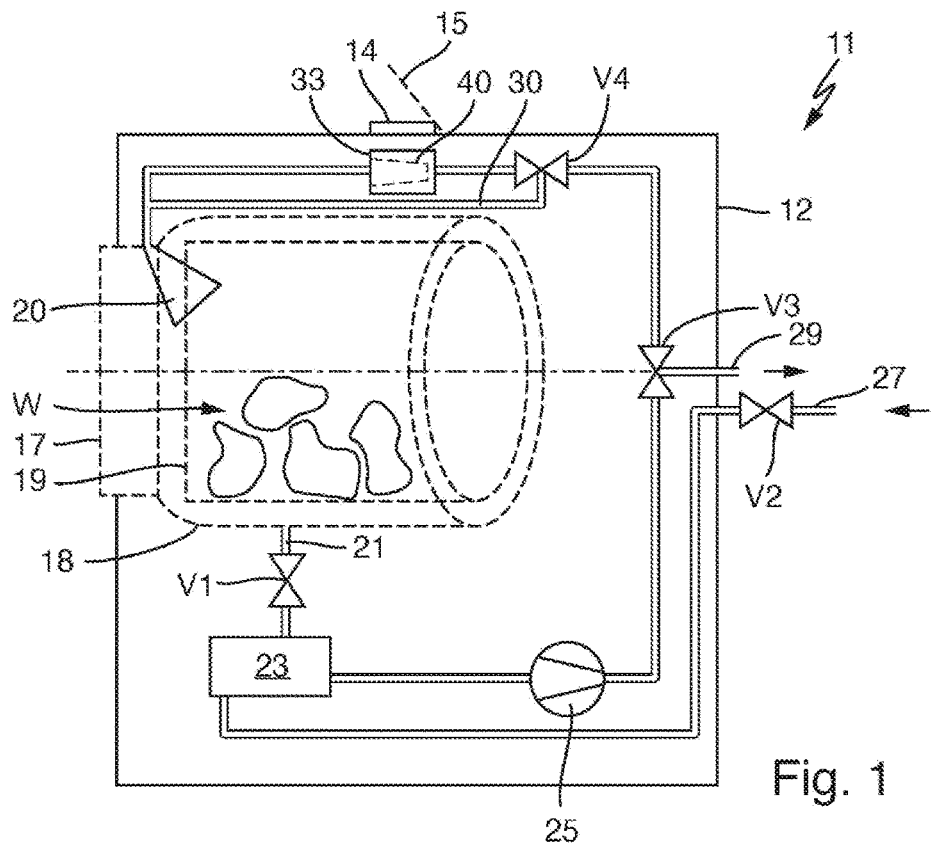
FIG. 1 shows a schematic functional representation of a washing machine as a domestic appliance according to the invention including a filter device according to the invention therein.

FIG. 1 shows a washing machine 11 according to the invention as the previously described water-bearing domestic appliance. Alternatively, it could also be a washer-dryer or possibly a dishwasher, or the like. The washing machine 11 has a housing 12 with an appliance opening 14 provided on the upper side including a flap 15 in order to be able to close the appliance opening 14. This appliance opening 14 serves to allow an operator to access a filter device 33 according to the invention arranged underneath. This is explained in more detail below. Furthermore, the washing machine 11 has a conventional door 17 on the left-hand side and a drum container 18 behind it, which contains a drum 19. In order to introduce water into the drum 19 and above all into the laundry W located therein, an injection device 20 known per se is provided in the area towards the door 17. This injection device 20 shows that the washing machine 11 is designed as a so-called circulation washing machine.

An outlet 21, which can be shut off by means of a first valve V1, leads out of the bottom of the drum container 18. A pre-filter 23 is provided downstream of the valve V1, which is used in particular to filter the water flowing through it in order to remove coarser impurities or particles. A water pipe leads from the pre-filter 23 to a pump 25. This pump 25 can have a heating device, as is known per se. Furthermore, a water pipe leads from below and at the top right into the pre-filter 23, which is connected to an inlet 27 by means of a further inlet valve V2. Here, fresh water can be introduced into the washing machine 11, which is first roughly filtered in the pre-filter 23 before it is pumped further by the pump 25. A water pipe leads from the pump 25 to an outlet valve V3, which is designed as a three-way valve. A pipe leads out of the washing machine 11 to the right towards an outlet 29, in particular to a sewage connection in a household. Another pipe leads up to a bypass valve V4. A possible water path of the bypass valve V4 leads relatively directly to the injection device 20 by means of a bypass pipe 30. Another water path leads to the aforementioned filter device 33 by means of a water pipe, specifically to its filter inlet. A filter outlet of the filter device 33 leads to the injection device 20 by means of another water pipe. Through this bypass pipe 30 together with the bypass valve V4, the filter device 33 can, so to speak, be switched on or switched off or bypassed. Whether this or its filter function is necessary can be recognized by a control system, not shown here, of the washing machine 11 based on various information, in particular based on sensors for detecting microfibers or other small impurities, for example.

Figure 2:
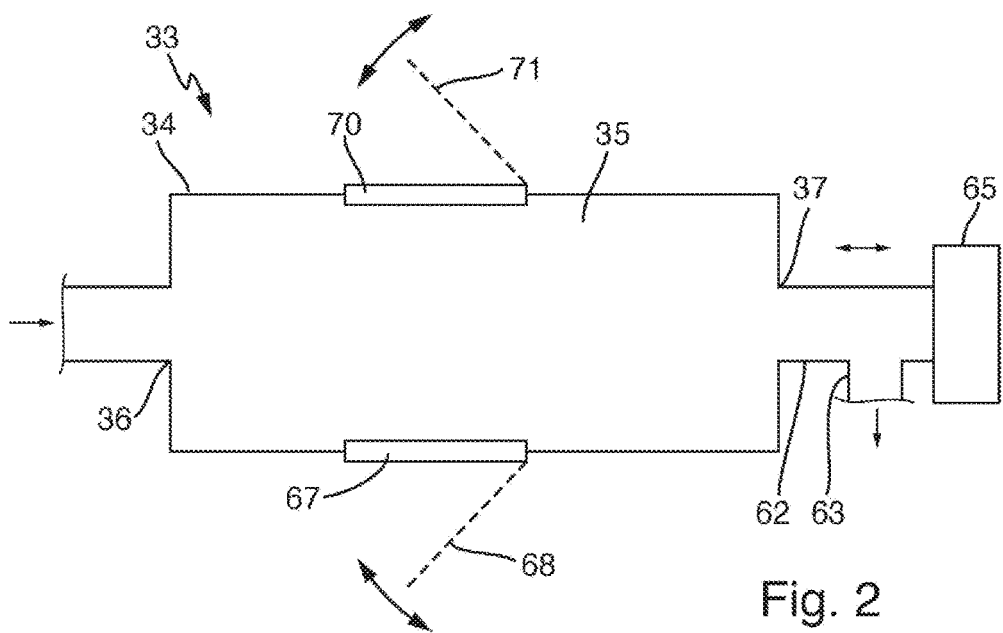
FIG. 2 shows a schematic representation of a filter device according to the invention.

FIG. 2 shows the filter device 33 according to the invention in an enlarged view. It has a filter housing 34 with an interior 35. A pipe comes from the left to a filter input 36. A filter outlet 37 leads out of the filter device 33 from the right, wherein this filter outlet 37 is advantageously realized by means of a flexible pipe which is designed here as a sleeve valve 62. It is movable to the left and to the right, as indicated by the arrow above, by means of a drive 65 at the right-hand end. A filter outlet pipe 63 leads downwards from the sleeve valve 62. Filtered water can escape from the filter device 33 from here.

At the bottom of the filter housing 34 there is a removal opening 67 which can be closed watertight by means of a removal flap 68. A supply opening 70 is provided at the top, which can be closed by means of a supply flap 71. These are explained in more detail below. A reservoir with surface filters can be arranged above it.

Figure 3:
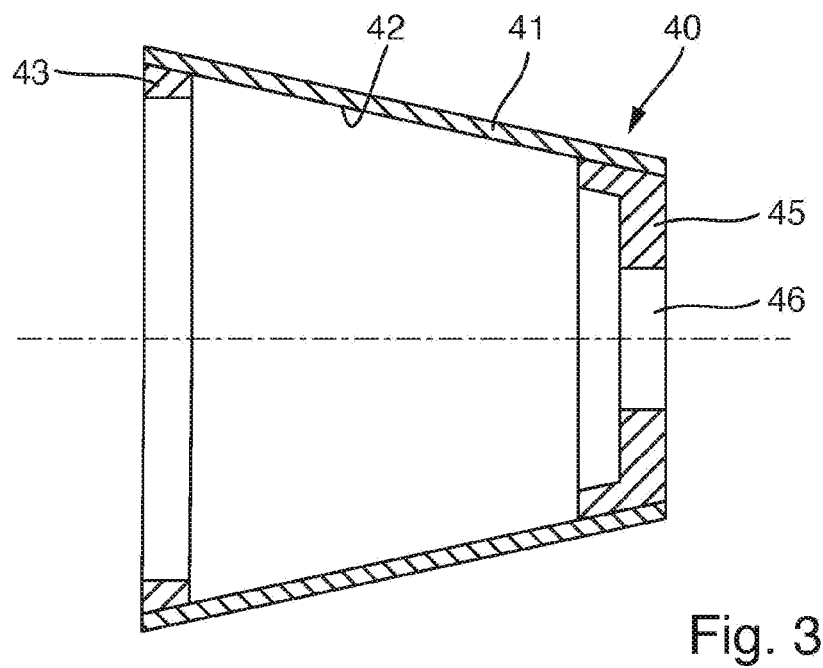
FIG. 3 shows a conical surface filter for the filter device according to the invention by itself.

FIG. 3 shows a sectional view of a conical surface filter 40. It is designed as a sleeve and has a uniform conical shape. Essentially, it is formed by filter material 41, which advantageously consists of filter paper or a filter fleece and has a certain strength or tensile strength, but is actually not particularly strong or is pliable. The filter properties of this filter material 41 should advantageously be approximately the same at every point, so that a uniform filter effect is achievable with good, uniformly distributed flow. An inner side 42 of the filter material 41 also has a conical shape due to the constant thickness of the filter material 41.

A circumferential first reinforcing ring 43 is provided on the inner side 42 of the filter material 41 at the widened, left-hand end. It can advantageously consist of plastic and be relatively thin, for example 1 mm to 5 mm thick. It can be glued to the filter material 41 or molded onto it. The first reinforcing ring 43 ensures that the surface filter 40 is dimensionally stable, although the filter material 41 itself can be relatively flexible.

A second reinforcing ring 45 is provided in a similar manner at the right-hand end of the surface filter 40 with the smaller diameter, in particular fastened in the same way. The second reinforcing ring 45 not only serves to keep the filter material 41 in shape, so to speak. At least one of the reinforcing rings 43 or 45 shown here can also be provided on an outer side of the surface filter, in particular permanently fastened or glued. However, this does not have to be the case, so that the outer side can remain in the perfect conical shape.

Furthermore, the second reinforcing ring 45 has a type of disk as a closure at the end of the surface filter 40, wherein a large central opening 46 is provided in this disk. A length of the surface filter 40 can be, for example, 3 cm to 10 cm; the diameter can be in a similar but somewhat smaller range, and the central opening 46 can have a diameter between 0.5 cm and 2 cm.

Figure 4:
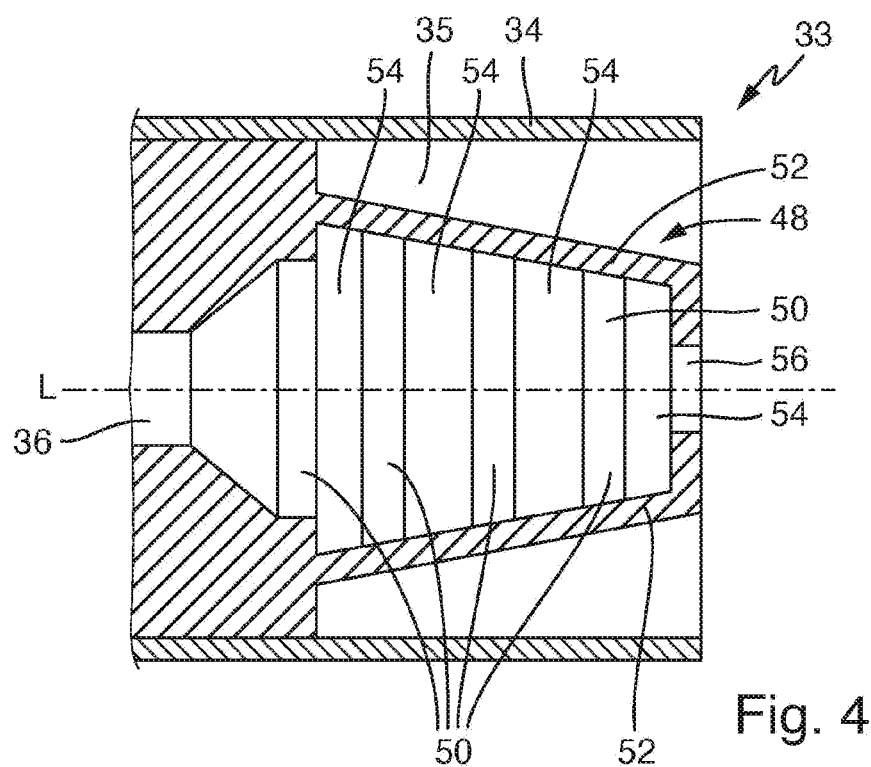
FIG. 4 shows a representation of a support structure with a rib-like structure in a sectional view.

A support structure 48 for the surface filter 40 from FIG. 3 is shown in FIG. 4. As can be clearly seen, the support structure 48 is connected and manufactured integrally, so to speak, with the left-hand area of the filter device 33 or its filter housing 34. The filter inlet 36 enters here from the left and, after widening, goes into the interior of the support structure 48. This support structure 48 is formed by four support ring ribs 50, which are annular and have different diameters and possibly also different distances from one another. The support ring ribs 50 are also beveled on their outer sides in such a way that they perfectly form the conical lateral surface. Furthermore, the four support ring ribs 50 shown here are connected in the longitudinal direction L of the filter device 33 shown in dot-dash lines by means of at least two longitudinal support ribs 52, in particular manufactured or injected in one piece. To the right, the support structure 48 is closed except for a central opening 56.

Figure 5:
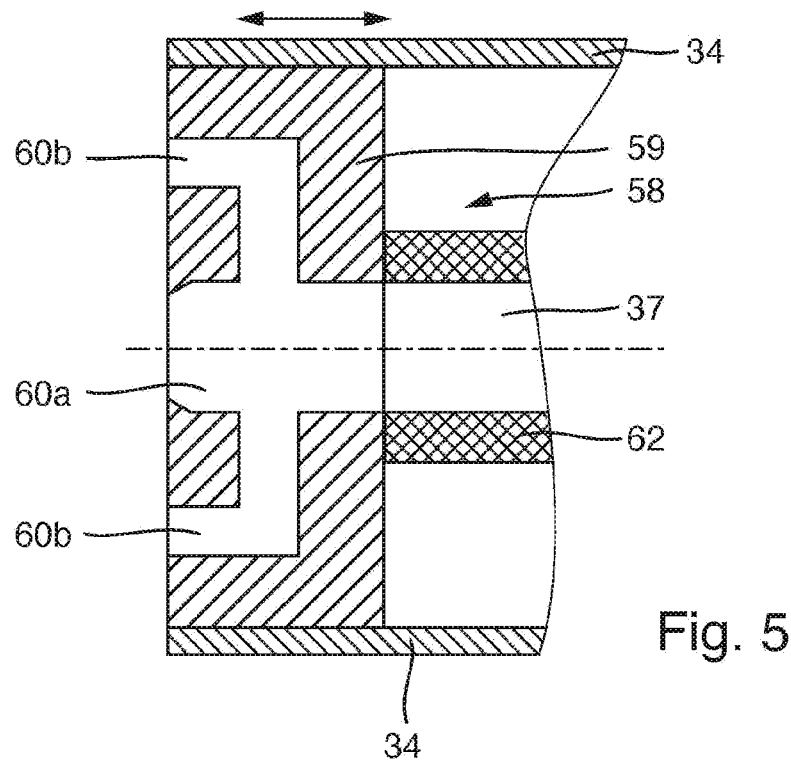
FIG. 5 shows a sectional view of a holding device for the surface filter from FIG. 3 on the support structure from FIG. 4.

A holding device 58 is shown in FIG. 5 in order to hold a surface filter 40 according to FIG. 3 on the support structure 48 according to FIG. 4. The holding device 58 has a holding slide 59 which can be moved to the left and right according to the arrow and rests against an inside of the filter housing 34. This inner side of the filter housing 34 forms the aforementioned holding guide for the holding slide 59 of the holding device 58, since the holding slide 59 can be guided precisely in the filter housing. The holding slide 59 can be a plastic part with channels therein. A central channel 60*a* has an opening which is open to the left and merges into a pipe to the right, which is designed here as the sleeve valve 62. This central channel 60*a* is applied to the support structure 48 from FIG. 4 from the right in such a way that the central opening 56 goes directly to the channel 60*a*.

Several channels 60*b*, which are outside the right-hand end of the support structure 48, are provided radially on the outside and distributed as far as possible. They lead inwards into the same water path as coming from the channel 60*a*, namely into the sleeve valve 62.

Figure 6:
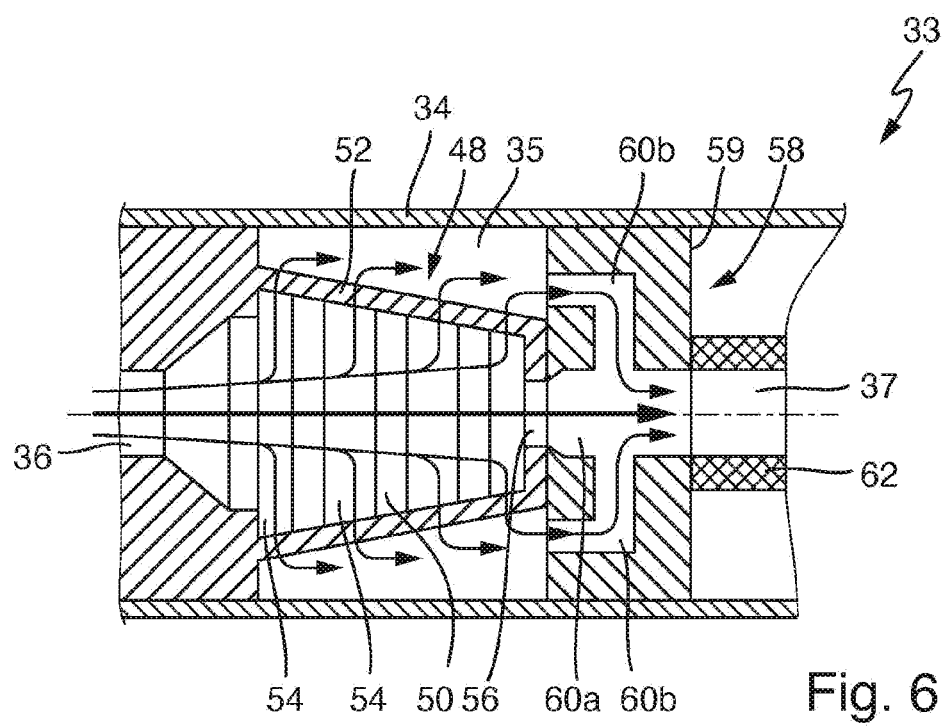
FIG. 6 shows a sectional view through the interior of the filter device, wherein the holding device from FIG. 5 is moved up to the support structure from FIG. 4.

FIG. 6 shows this aforementioned state when, here without a surface filter 40, the holding slide 59 of the holding device 58 is in contact with the right, narrower end of the support structure 48. A previously described first flow path is shown in thin arrows; this goes from the filter inlet 36 through the through-flow openings 54 of the support structure 48 into the interior 35. From there it continues through the channels 60*b* to the sleeve valve 62 and thus out of the filter housing 34.

A second flow path is shown with a bold arrow through the filter inlet 36 into the filter device 33. The second flow path runs essentially along the dot-dash central longitudinal axis through the central opening 56 of the support structure 48 and the channel 60*a* of the holding slide 59. It also leads into the sleeve valve 62 and thus out of the filter housing 34. As previously explained, considerably more water should flow along the second flow path than along the first flow path, specifically when a surface filter 40 is applied to the support structure 48, see FIG. 9 and the description below. A distribution can be such that, for example, 10% to 30% of the total water flowing through the filter device 33 runs along the first flow path while the rest runs along the second flow path.

Figure 7:
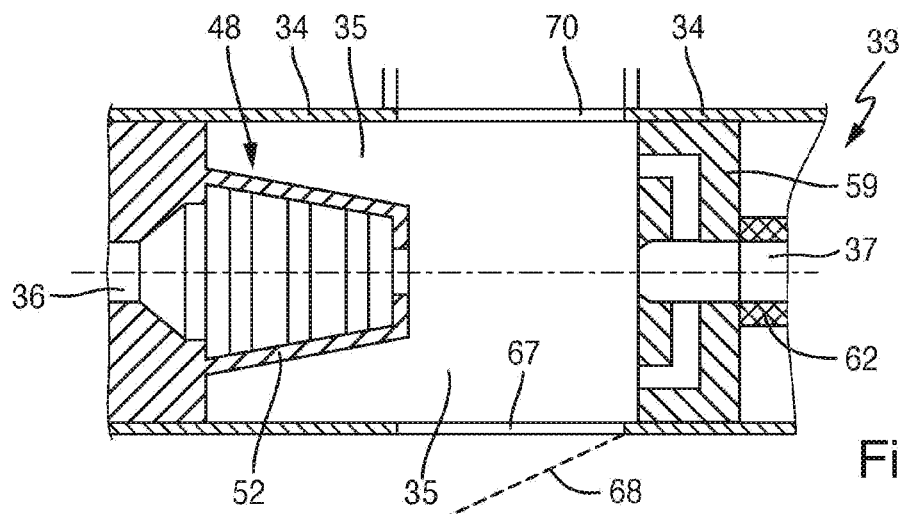
FIG. 7 shows an interior view of the filter device similar to that of FIG. 6, wherein the holding device is removed from the support structure.

FIG. 7 shows the filter device from FIG. 6, wherein the holding slide 59 of the holding device 58 is moved to the right, away from the support structure 48, by a distance of 5 cm to 12 cm, for example. The drive 65 according to FIG. 2 is provided for this purpose, for example a linear drive or a rack and pinion drive.

It can also be seen from FIG. 7 that a downward-oriented removal opening 67 is provided below the region between the support structure 48 and the holding slide 59. This removal opening 67 can be sufficiently large that a complete surface filter 40 fits through it without the need for deformation, and can be removed downwards from the filter housing 34 or can simply fall out. The removal opening 67 can be closed, in particularly in a watertight manner, by means of a removal flap 68 shown in dashed lines.

A supply opening 70 of similar size and design is provided above this area or also above the removal opening 67. It can also be closed with a supply flap 71 shown in FIG. 2. A storage container for a large number of new and unused surface filters 40 can be arranged at the top at the supply opening 70. A collection container for consumed or used surface filters can be arranged in a similar manner below the removal opening 67. Such a collection container can be removed or emptied, for example, by means of the appliance opening 14 according to FIG. 1. Alternatively, through this appliance opening 14, an operator can manually insert surface filters 40 through the supply opening 70 into the filter device 33 and also remove them again. In this case, the removal opening 67 underneath could be dispensed with.

Figure 8:
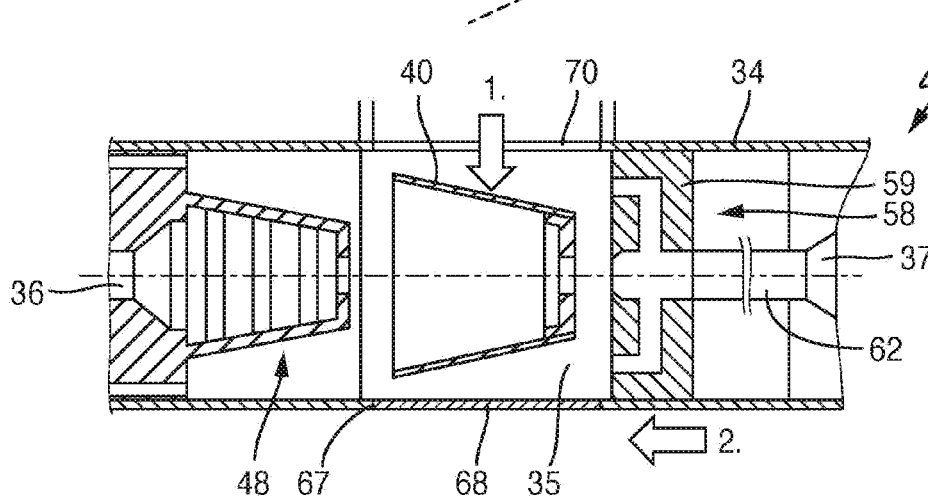
FIG. 8 shows the representation of the filter device from FIG. 7 with the unused new surface filter introduced from above.
Figure 9:
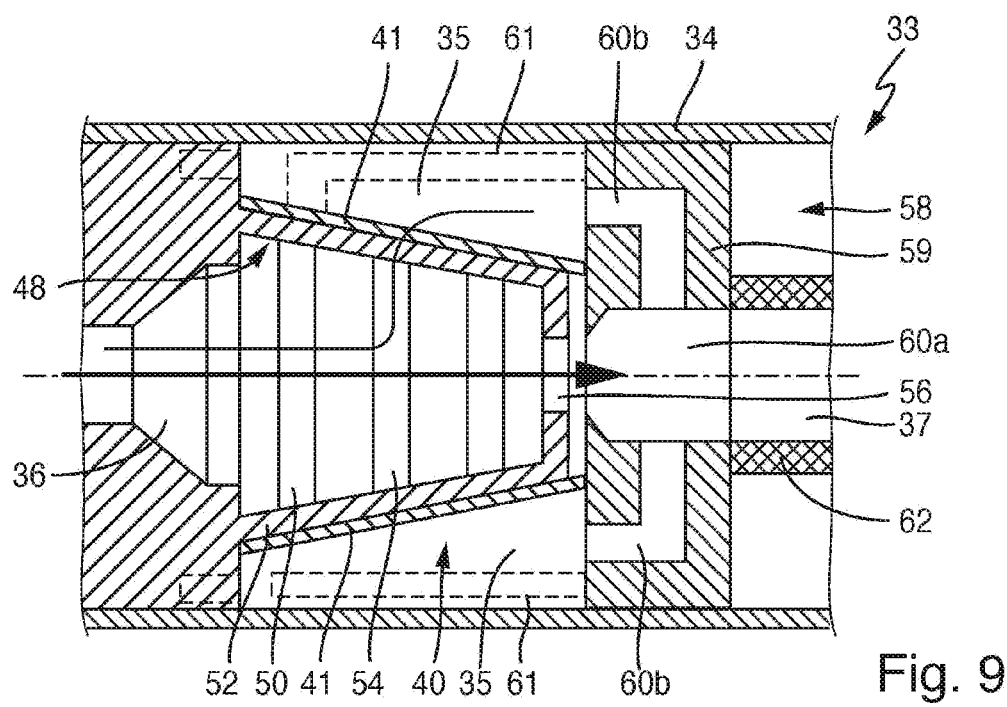
FIG. 9 shows an illustration similar to that of FIG. 6 with the surface filter pushed onto the support structure by the holding device, wherein the two flow paths are indicated with thin arrows and with bold arrows.

In comparison to FIG. 7, FIG. 8 shows that a new, unused surface filter 40 is introduced from above through the supply opening 70. This can be done manually or by means of an automatic feeding, which is not shown here but is easy to implement. Since the removal opening 67 is closed with the removal flap 68, the surface filter 40 cannot fall further down. Then the holding slide 59 of the holding device 58 is moved from the right in a second step, as illustrated by the arrow. This pushes the unused surface filter 40 onto the support structure 48 and holds it there. As shown in FIG. 9, the holding slide 59 is in abutment with the support structure 48, either directly or with the second reinforcing ring 45 of the surface filter 40 lying in between. The surface filter 40 sits flush and snugly on the support structure 48 and is held in shape and position by the support structure. Instead of a holding device that only presses the surface filter onto the support structure 48 from the right, it can also be provided that it has a lattice structure or rib structure similar to the support structure 48 itself, so that it only just fits on the outside of the surface filter 40. The surface filter 40 can then be pressed onto the outside of the support structure 48 wherever it has support ring ribs 50 and longitudinal support ribs 52. This is indicated in dashed lines as a long arm 61 at the top and bottom. Rings such as those described above could also be provided or formed on these arms 61, the position of which corresponds exactly to the support ring ribs 50. In this way, they then lie exactly with the filter material 41 in between on the outer side of the support ring ribs 50.

In the position of FIG. 9, water can now flow in from the left to the filter inlet 36 and run along the two flow paths according to FIG. 6, as is partially indicated. If this water is pumped through by means of the pump 25 in accordance with a first through-flow described at the outset, which is not yet very strong, for example less than 1 l/min, part of the water flows along the second through-flow path directly through the central opening 46 of the surface filter 40 and out again through the central opening 56 of the support structure 48 and through the channel 60*a* of the holding slide 59 to the sleeve valve 62 and thus to the filter outlet pipe. However, part of the water flows along the first flow path according to FIG. 6 through the support structure 48 or the support ring ribs 50 and the longitudinal support ribs 52 and through the filter material 41 of the surface filter 40. In doing so, it is filtered or impurities are retained and it can then flow out of the interior 35 through the channels 60*b* to the sleeve valve 62 and to the filter outlet pipe. In this way, vortices are formed within the support structure 48 or between the support ring ribs 50 and the longitudinal support ribs 52, in which the impurities retained by the filter material 41 are kept. This means these impurities are not on the inside 42 of the surface filter 40 and thus cannot clog it. At the same time, however, they are not entrained along the second flow path, to prevent them being reintroduced into the exiting water.

Figure 10:
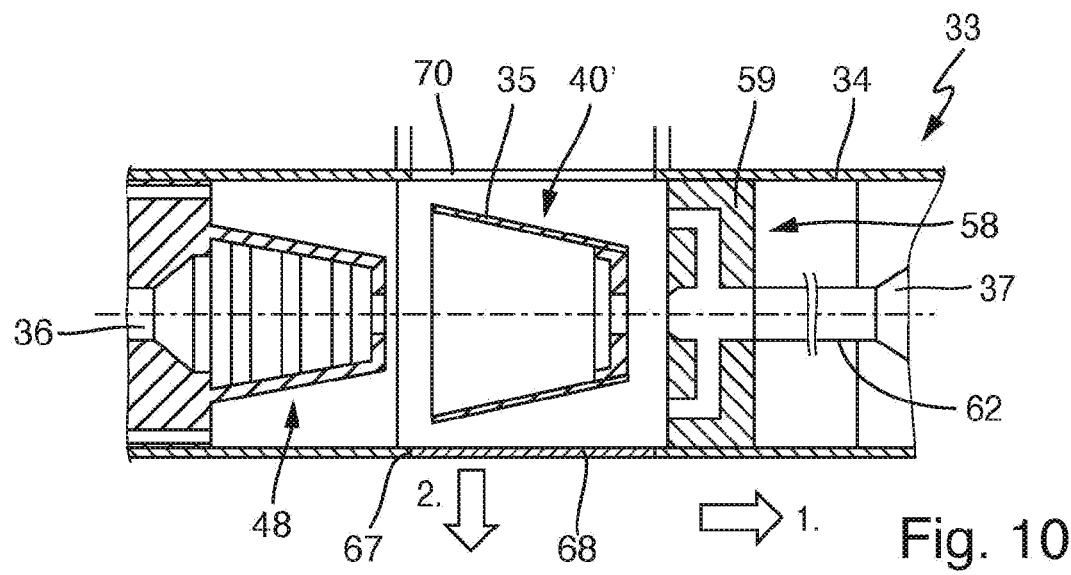
FIG. 10 shows a representation corresponding to that of FIG. 8, wherein the used surface filter is exposed by removing the holding device from the support structure and can be disposed of downwards through a removal opening.

A flow strength for this first flow can easily be determined experimentally. If, for example after the end of a washing process for the laundry W, these impurities, which are advantageously microfibers, are to be removed, the pump 25 can set a significantly stronger flow, for example twice as high or three times as high. The flow conditions in the filter device 33 then change, and more water attempts to flow through the surface filter 40 along the first flow path. According to the above example, this higher second flow can be 2 l/min to 3 l/min. Then the retained impurities, in particular microfibers, are no longer held in vortices, but are pressed against the inner side 42 of the surface filter 40 and thus become fixed to it, so to speak. This can be done for a predetermined time, for example 20 seconds to 60 seconds. After this time has elapsed, the pump 25 stops operating and the filter device 33 can be emptied or water can drain off. Once this has taken place, in a first step the drive 65 moves the holding slide 59 towards the right, as shown in FIG. 10. If this is moved all the way to the right, the removal opening 67 is released by opening the removal flap 68, and the used or consumed surface filter 40' can be removed or disposed of downwards or, for example, it can also fall down automatically. It is then outside of the filter device 33, as shown in dashed lines in FIG. 11.

Figure 11:
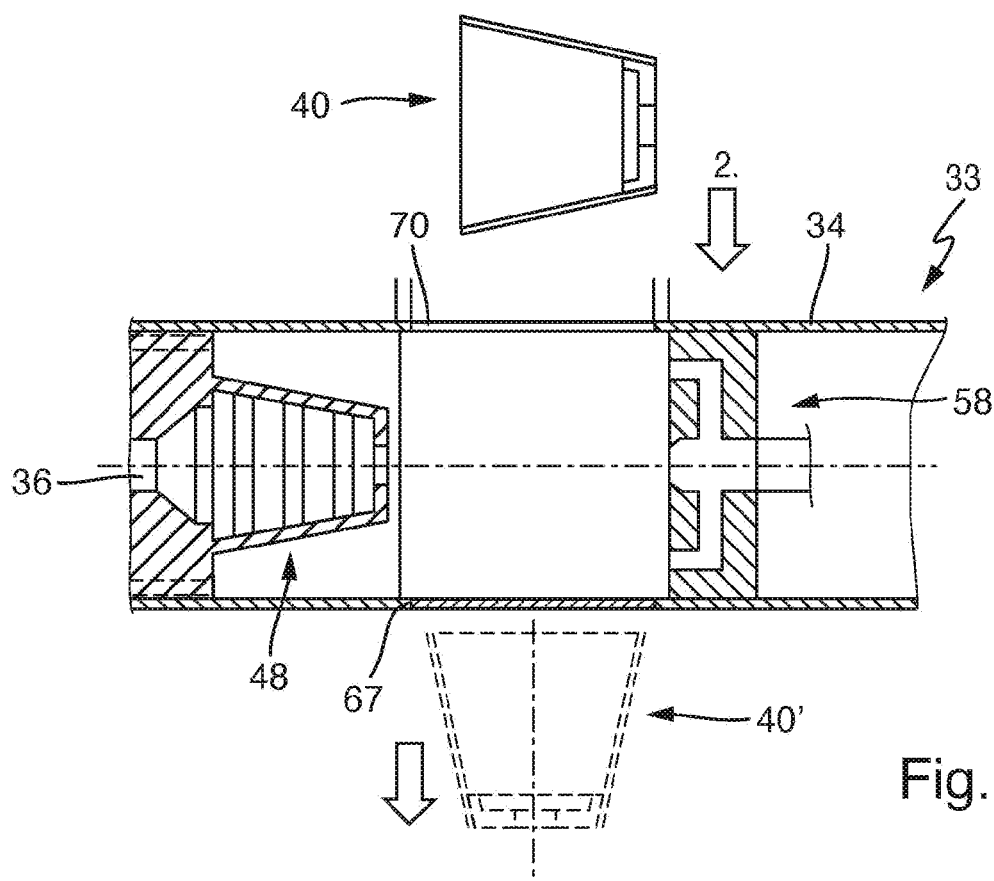
FIG. 11 shows a representation based on that of FIG. 10, in which the used surface filter has been removed downwards through the removal opening and a new, unused surface filter is fed in from above through a supply opening.

As is also shown in FIG. 11, a fresh and unused filter 40 can be inserted from above through the supply opening 70, so that the state shown in FIG. 8 is achieved. It is easy to imagine how this replacement of the surface filter 40 can also be done manually. The drive 65 can also be replaced by a manual lever or the like.

The filter device 33 can be switched on by means of the bypass valve V4 including the bypass pipe 30, either when selecting a program, an operator enters into the washing machine 11 that laundry with a certain or high microfiber content is to be washed. Alternatively, a sensor system can also be provided that detects when certain previously defined limit values for microfibers in the circulating water are exceeded.

The support structure 48 including the applied surface filter 40 is designed as a so-called Sanderson filter. Its exact function is known from the prior art. Its mode of operation is based on processes in nature, in particular the aspect that when water flows through below a limit value, impurities filtered out do not lie on the inside of the filter surface, but remain in vortices, so to speak, between the ribs. A limit value for this flow through the filter device 33 can be between 0.1 l/min and 1 l/min to 2 l/min.

The introduction and holding of a new, unused surface filter 40 on the support structure 48 as well as the disposal of a used and spent surface filter can correspond to a principle known from automatic coffee machines, in particular those offered by the Nespresso company. In particular, the handling of the surface filter 40 can be similar to that of aluminum capsules filled with coffee grounds used in that industry.

The invention claimed is:

1. A filter device for a water-bearing domestic appliance, wherein said filter device has:
   a surface filter with a sleeve shape and
   a support structure for said surface filter,
   a flow-through filter housing with a filter inlet and a filter outlet,
   wherein:
   said surface filter is held on said support structure and is held stably by said support structure in a surface filter shape adapted to an outer shape of said support structure,
   said support structure has through-flow openings towards said surface filter and a central opening at one end of said support structure,
   a first flow path for water leading into said support structure and leading out of said support structure through said through-flow openings,
   a second flow path for water leading into said support structure and leading out of said support structure through said central opening at said one end of said support structure,
   wherein:
   said support structure is designed in a circumferential manner and is formed by support ribs forming or comprising said through-flow openings between them,
   said surface filter is attached to an outside of said support structure in such a way that said surface filter covers said through-flow openings and rests on an outside of said support ribs.

2. The filter device according to claim 1, wherein an end of said support structure pointing in a flow direction of water to be filtered is closed except for said central opening.

3. The filter device according to claim 1, wherein said surface filter has a filter material selected from the group consisting of paper, filter paper, fabric, scrim, knitted fabric, and knitted fabric consisting of synthetic fibers.

4. The filter device according to claim 1, wherein, in a flow direction of water to be filtered, said support structure including said surface filter comes behind said filter inlet into said filter housing, wherein said support structure including said surface filter is arranged in said filter housing in such a way that all water flowing through said filter device or said filter housing flows through said support structure, wherein said filter outlet leads out of said filter housing.

5. The filter device according to claim 4, wherein, in said flow direction of said water to be filtered, said support structure including said surface filter comes behind said filter inlet into said filter housing, wherein said support structure including said surface filter is arranged in said filter housing in such a way that only part of said water flowing through said filter device or through said filter housing flows along said first flow path through said surface filter, wherein said filter outlet leads out of said filter housing, wherein a remaining part of said water flows along said second flow path past said surface filter through said filter housing.

6. The filter device according to claim 1, wherein said filter housing can be opened or has a removal opening and has a filter housing closure thereon, wherein said filter housing closure is designed to be removable or movable away from said removal opening in such a way that said surface filter can be removed from said support structure and can be removed from said filter housing for disposal, wherein after said removal a fresh, unused surface filter can be brought onto said support structure.

7. The filter device according to claim 1, wherein a holding device is provided for holding said surface filter onto said support structure, which holding device rests at least partially on said surface filter.

8. The filter device according to claim 7, wherein said surface filter is held between said holding device and said support structure, wherein said holding device is provided in an end region of said surface filter lying opposite to a flow direction along said first flow path, wherein said holding device is removable from said support structure in such a way that said surface filter is free or said holding device no longer rests on said surface filter.

9. The filter device according to claim 7, wherein said holding device rests against said surface filter at at least two points in a circumferential direction of said surface filter with said surface filter pressed in between against said support structure.

10. The filter device according to claim 9, wherein said holding device has circumferential retaining ring, wherein an arrangement of said at least one retaining ring corresponds to said arrangement of at least one support rib, or said retaining ring rests on said support rib.

11. The filter device according to claim 7, wherein said holding device essentially covers an outer surface of said surface filter and is designed to be largely water-permeable, wherein said holding device has a retaining surface, designed as a sieve or net or having a rib structure or a lattice structure corresponding to an outside of said surface filter, said holding device resting on an outside of said support structure.

12. The filter device according to claim 6, wherein a holding guide is provided for said holding device, along which it can be moved in a guided manner, wherein said holding guide is designed in such a way that
in a first end position, said holding device holds said surface filter firmly on said support structure, and is pressed thereagainst, and
in a further second end position, said holding device releases said surface filter for complete detachment of said surface filter from said support structure, wherein a movement path of said holding guide leads past said removal opening, in order to remove a used surface filter and insert a fresh, unused surface filter.

13. The filter device according to claim 7, wherein said holding device and/or said holding guide have a drive for moving said holding device on or along said holding guide.

14. The filter device according to claim 13, wherein said filter device has a removal device for removing a surface filter from said holding device or out of said holding device.

15. The filter device according to claim 12, wherein a supply of said surface filters is provided in a supply holder, and said supply holder has a supply opening for removing one said surface filter from said supply holder being arranged close to or directly at said removal opening.

16. The filter device according to claim 15, wherein insertion means are provided in order to insert one said surface filter into said filter housing and to bring said surface filter onto said support structure or to insert said surface filter into said holding device.

17. A water-bearing domestic appliance with a filter device according to claim 1, wherein said domestic appliance has a treatment chamber for objects to be treated, a pump, water pipes and said filter device, wherein a pump outlet from said pump is connected to said filter inlet by means of a water pipe.

18. The water-bearing domestic appliance according to claim 17, wherein a collection container for used surface filters is provided under a removal opening from said filter housing, wherein (a) wherein said filter housing can be opened or has a removal opening and has a filter housing closure thereon, wherein said filter housing closure is designed to be removable or movable away from said removal opening in such a way that said surface filter can be removed from said support structure and can be removed from said filter housing for disposal, wherein after said removal a fresh, unused surface filter can be brought onto said support structure, and (b) said collection container is removable from said domestic appliance through a closable appliance opening.

19. The water-bearing domestic appliance according to claim 18, wherein appliance opening is arranged on an accessible side of said domestic appliance or on a front side of said domestic appliance.

20. A method for filtering water in a filter device of a water-bearing domestic appliance according to claim 17, wherein the following steps are provided:
in normal operation of said domestic appliance, water is pumped through said filter device by said pump for filtering purposes,
in order to filter said water, a flow of water through said filter device is set to a first limit value,
in an exchange operation for exchanging said surface filter of said filter device, water is pumped by said pump through said filter device with an increased flow that is higher than said first limit value,
said pump operates with said increased flow for a specified pumping time,
then said operation of said pump is completely stopped, wherein water is removed from said filter housing,
said surface filter is subsequently removed from said filter device and said filter housing and a new and unused surface filter is inserted.

21. The method according to claim 20, wherein (a) said removal of said surface filter from said filter device and from said filter housing or said insertion of said new and unused surface filter takes place automatically by means of said holding device, which holding device has a controllable drive for said purpose, and (b) a holding device is provided for holding said surface filter onto said support structure, which holding device rests at least partially on said surface filter.

22. The method according to claim 20, wherein (a) said removal of said surface filter from said filter device and from said filter housing or said insertion of said new and unused surface filter takes place manually, (b) said holding device is actuated manually by an operator, and (c) a holding device is provided for holding said surface filter onto said support structure, which holding device rests at least partially on said surface filter.

* * * * *